United States Patent [19]
Tranchita et al.

[11] Patent Number: 5,739,847
[45] Date of Patent: Apr. 14, 1998

[54] VARIED INTENSITY AND/OR INFRARED AUXILIARY ILLUMINATION OF SURVEILLANCE AREA

[75] Inventors: Charles J. Tranchita, Glen Ellyn; Paul D. Lang, Palatine; Ronald B. Jones, Hoffman Estates, all of Ill.

[73] Assignee: Northrop Grumman Corporation, Los Angeles, Calif.

[21] Appl. No.: 406,423

[22] Filed: Mar. 20, 1995

[51] Int. Cl.$^6$ ...................................................... H04N 7/18
[52] U.S. Cl. ................................................ 348/143; 348/370
[58] Field of Search ................................. 348/370, 371, 348/143, 148, 149, 150, 151, 152, 153, 154, 155, 156, 157, 158, 159, 362; 354/75, 76, 81, 126, 145.1, 413, 416, 417, 412; 352/49, 198, 200

[56] References Cited

U.S. PATENT DOCUMENTS

| | | | |
|---|---|---|---|
| 4,027,334 | 5/1977 | Grant | 348/370 |
| 4,707,595 | 11/1987 | Meyers | 250/504 R |
| 4,782,386 | 11/1988 | Arns et al. | 348/371 |
| 4,866,285 | 9/1989 | Simms | 250/495.1 |
| 4,991,183 | 2/1991 | Meyers | 372/100 |
| 5,061,997 | 10/1991 | Rea et al. | 348/143 |
| 5,130,737 | 7/1992 | Azuma et al. | 354/416 |
| 5,550,641 | 8/1996 | Shashua et al. | 348/370 |

Primary Examiner—Tommy P. Chin
Assistant Examiner—A. Au
Attorney, Agent, or Firm—Terry J. Anderson; Karl J. Hoch, Jr.

[57] ABSTRACT

Infrared radiation from a light source such as a laser diode illuminates the field of view of a surveillance camera. The amount of illumination is varied in intervals, which may for example, be about ¾ of a second, by varying the power applied to the light source. The radiation may emanate from optical fibers surrounding a camera lens, or through other ports. The power to the laser diode may be altered in response to background light sensed by a photo cell.

4 Claims, 1 Drawing Sheet

VARIED INTENSITY AND/OR INFRARED AUXILIARY ILLUMINATION OF SURVEILLANCE AREA

TECHNICAL FIELD

This invention relates to enhancing the illumination of surveillance fields of view for video and/or photographic recording of activity, such as in the vicinity of automatic teller machines (ATMs) and other areas.

BACKGROUND ART

Recording of surveillance scenes is commonly used to deter criminal activity and to assist in apprehending the person responsible for the crime. Inside of banks and stores, video cameras have been quite successful in assisting the apprehension, and therefore useful as deterrents. On the other hand, recorded surveillance in the vicinity of automatic teller machines has been less successful. The scene monitored by a video camera at an ATM is typically poorly lit for video/photographic purposes. The field of interest is typically back lit and/or underexposed in that the sun or remote lights adequately illuminate the background scene, but not the face of an ATM user or an attacker near the ATM. In bright sunlight, for instance, the camera automatic gain control (AGC) may reduce sensitivity below that which provides an adequate definition of a face near the ATM.

Even with additional illumination, it frequently happens that the video or photographic record will be overexposed, or underexposed, despite the use of AGC and reasonable illumination.

The problem could be solved by bright spotlights shining on the area where the ATM user (or other subject) would normally be while operating the machine, but this will make customers extremely uncomfortable, and sun-blind the user to the extent of making it difficult to read the prompts and indicia while using the machine, and difficult to see an oncoming attacker or other threat.

DISCLOSURE OF INVENTION

Objects of the invention include provision of adequate illumination of the field of view of a surveillance recorder, and assurance of proper balance of illumination and sensitivity to yield a recognizable pattern of the recorded image of someone in the field of view of a surveillance recorder.

As used herein, the field of surveillance recording including video records (both digital and analog) and photographic records will be referred to, for convenience only, as video records. Thus, although the invention is described and claimed in terms of video cameras, recordings and playback, such terms will include photographic equivalents thereof.

According to the present invention, the field of view of a video camera utilized for security surveillance is illuminated with high intensity infrared radiation thereby to adequately illuminate objects and faces near the camera (such as a user or an attacker near an ATM), adequately to record the characteristics thereof despite the amount or variation in background illumination (such as from the sun and remote lighting).

In accordance with the invention, the intensity of illumination of a surveillance field of view is constantly varied with respect to time so that for any one subject, video records will be made at various levels of illumination, thereby enhancing the capability to distinguish features of the subject.

In further accord with the invention, the illumination is varied as between bright and dark backgrounds, thereby assuring an adequate general level of illumination (in sunlight) without excessive illumination (at night).

The invention provides a much greater assurance of being able to recognize individuals in the field of a view of a video camera, both in daylight and at night, without unduly impairing the ability of subjects of the video record to see sufficiently to use an ATM machine and avoid threats in the area. The invention is extremely simple and capable of being implemented in a variety of configurations to suit indoor and outdoor surveillance areas, in confined and open spaces, in existing as well as new installations.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
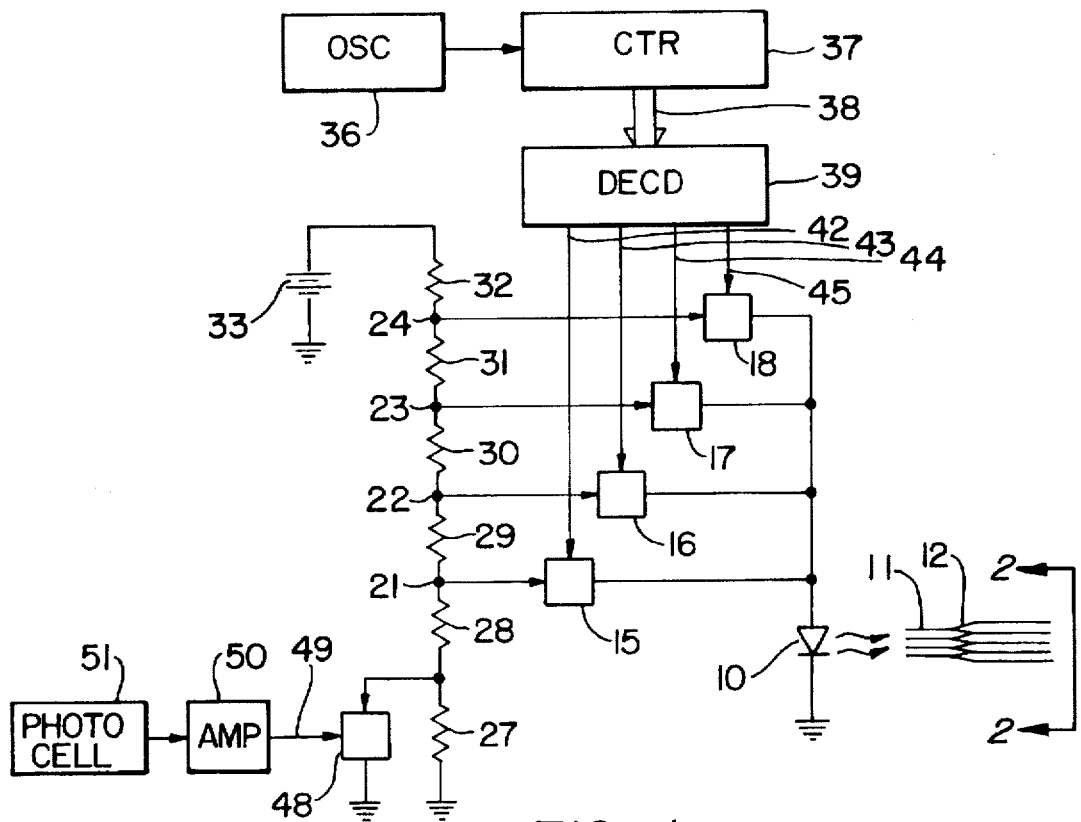
FIG. 1 is a simplified schematic block diagram of an exemplary embodiment of the invention.
Figure 2:
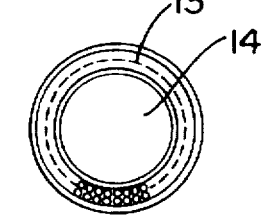
FIG. 2 is a front elevation view of a camera lens employing the invention, taken on the line 2—2 of FIG. 1.
Figure 4:
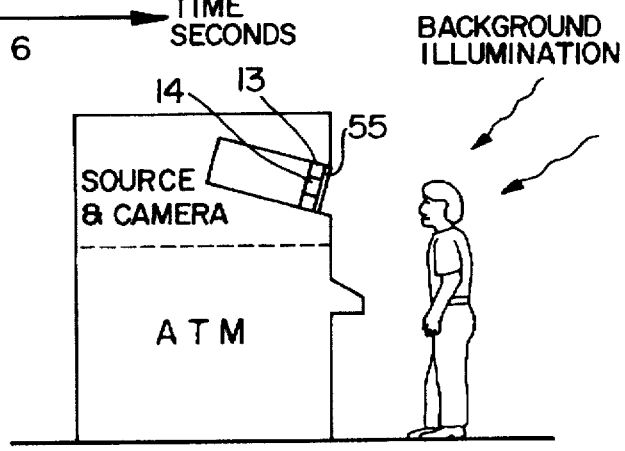
FIG. 4 is a stylized illustration of the invention viewing a surveillance object at an ATM.

Referring to FIG. 1, a light source 10, which may be a laser diode or one or more LEDs, illuminates a plurality of optical fibers 11 which may be split so as to feed additional optical fibers 12, to conduct the light from the source 10 and radiate it toward a surveillance field of view (to the right of FIG. 1), as seen in FIG. 4. The source 10 may be an infrared laser, such as an Opto Power Corp. OPC-A001. As seen in FIG. 2, the optical fibers 12 may terminate in an annulus 13 surrounding a lens 14 of a video camera. In such a case, the fibers may be selected from those readily available which have suitably shaped tips to provide about a 30° dispersion of radiation emanating from the tips thereof.

In accordance with the invention, the infrared laser diode 10 may be operated in a manner to provide varying intensity of illumination by providing different operating voltages to it through selectively operated switches, such as a plurality of field effect transistor switches (FETs) 15–18, each applying a corresponding voltage from a tap 21–24 of a voltage divider which includes a plurality of resistors 27–32 between a suitable DC source 33 and ground.

Figure 3:
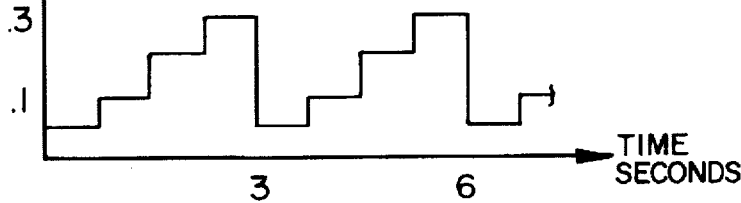
FIG. 3 is a simplified illustration of the timing of the embodiment of FIG. 1.

An oscillator 36 drives a counter 37, the output of which on a plurality of lines 38 is decoded by a decode circuit 39 so as to provide signals on related lines 42–45 that, by successive operation of corresponding FETs 15–18 will provide steps of increasing voltage, which may be of 750 millisecond duration as illustrated in FIG. 3, or which may be adjusted to provide successive periods of varying illumination of any suitable length. The voltage steps may be selected with respect to the particular source 10 used so as to provide correct variation of illumination, which may (in the example herein) range from 0.05 watts to 0.3 watts, as seen in FIG. 3. The source of light 10 may be one or more LEDs, either infrared or otherwise, or any other suitable light source. In any case, the power steps should be chosen so as to provide, with the highest voltage, adequate illumination to record distinguishable features of a person in under the most dimly lit conditions of a particular surveillance field of view, and to provide, with the lowest voltage, an illumination sufficiently low so as to not to overexpose the same surveillance area at a time when it may be brightly lit.

If it is found to be useful, the invention may include the ability to shift the voltages by altering the voltage divider. For instance, the resistor 27 may be shorted out by a FET 48 when it receives a signal on a line 49, power conditioned by an amplifier 50 in response to a photo cell 51 detecting a given brightness level in the surveillance field of view. The photo cell 51 may be utilized to reduce the power provided to the infrared laser diode 10 during daylight; or it could be used to distinguish between the illumination outside of a gas station in a period when the gas station is in operation and the lights are on from the period after the gas station is closed and most of the external lights are turned off. There are numerous other ways to alter the illumination, such as by having several ranges of alteration provided as a function of background lighting. If not useful, the variation in lighting provided by the apparatus 48–51 need not be utilized. Or, an increase in the power level may be achieved by shorting out resistor at the upper end of the voltage divider, in a similar fashion.

The invention may of course be utilized with a greater or lesser number of steps than in the example given herein; it may utilize continuously ramping power, by substituting a cyclic voltage ramp for the apparatus of FIG. 1; or it may utilize pulses of increasing steps synchronized with the camera vertical frame rate; and it may be altered in other respects, utilizing apparatus and techniques known to the art.

Instead of conducting radiation along the optical fibers 11, 12, a diode or other light source may be mounted directly in front of a lens or other port which overlooks the surveillance field of view.

The invention, by utilizing infrared, provides adequate illumination without attracting attention to the source of the illumination, and without alarming or sun-blinding customers in the surveillance field of view. The invention provides illumination where needed, to support video or photographic recording of the surveillance field of view.

The invention may preferably be used with a real-time movie camera (video or photographic), but may also be used with a camera which records images in time-interspersed frames (e.g., two frames per second); the term "surveillance camera" includes any such camera.

As shown in FIG. 4, the invention may utilize an infrared filter 55 in front of the camera lens 14 to filter out visible illumination from background sources, and preferentially pass infrared illumination, thereby enhancing the desired image of an object in the field of view of a surveillance camera.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of recording successive frames of images of subjects in a surveillance field of view by means of a surveillance camera which method includes illuminating said field of view with a source of illumination, and varying the intensity of said illumination as a function of time at a rate with respect to the timing of said successive frames of recorded images to assure each subject being recorded in said successive frames at varying levels of intensity of illumination of the subject.

2. A method according to claim 1 comprising illuminating said field of view with a source of infrared illumination.

3. A method according to claim 1 comprising illuminating said field of view with a source which comprises a laser diode.

4. A method according to claim 1 comprising illuminating said field of view with a source which comprises a light emitting diode.

\* \* \* \* \*